United States Patent
Groenendaal et al.

(10) Patent No.: US 6,993,686 B1
(45) Date of Patent: Jan. 31, 2006

(54) SYSTEM HEALTH MONITORING AND RECOVERY

(75) Inventors: Edward John Groenendaal, New South Wales (AU); Peter Joseph Hanselmann, New South Wales (AU); Gene Michael Clendon, New South Wales (AU)

(73) Assignee: Cisco Technology, Inc., San Jose, CA (US)

(*) Notice: Subject to any disclaimer, the term of this patent is extended or adjusted under 35 U.S.C. 154(b) by 431 days.

(21) Appl. No.: 10/136,665

(22) Filed: Apr. 30, 2002

(51) Int. Cl.
*G06F 11/00* (2006.01)

(52) U.S. Cl. .................................... 714/47; 709/224
(58) Field of Classification Search ............ 714/47; 709/224
See application file for complete search history.

(56) References Cited

U.S. PATENT DOCUMENTS

| | | | | |
|---|---|---|---|---|
| 5,819,028 A | * | 10/1998 | Manghirmalani et al. | 709/224 |
| 6,349,325 B1 | * | 2/2002 | Newcombe et al. | 709/202 |
| 6,714,976 B1 | * | 3/2004 | Wilson et al. | 709/224 |
| 6,738,811 B1 | * | 5/2004 | Liang | 709/224 |
| 2003/0065986 A1 | * | 4/2003 | Fraenkel et al. | 714/47 |
| 2003/0069953 A1 | * | 4/2003 | Bottom et al. | 709/223 |

* cited by examiner

*Primary Examiner*—Scott Baderman
*Assistant Examiner*—Paul L. Contino
(74) *Attorney, Agent, or Firm*—Johnson & McCollom, P.C.

(57) ABSTRACT

A network device. The network device includes a least one communication port that allows communication with at least one other network device and storage to store a rules database. At least one health monitor module receives an event notification, then accesses the rules database to locate a matching rule for the event notification and perform any tasks determined by the rules database.

21 Claims, 3 Drawing Sheets

US 6,993,686 B1

SYSTEM HEALTH MONITORING AND RECOVERY

BACKGROUND

1. Field

This disclosure relates to monitoring system health metrics, more particularly to adjusting system performance and configuration based upon the system health metrics.

2. Background

Application management products offer system administrators the ability to adjust system operation depending upon negative 'health' or operational conditions of the system. Generally, these types of products rely upon a discrete number of status levels.

For example, in a traditional network monitoring system, the health of a subsystem is represented by a status. The status generally comes from one of a discrete number of severity levels. For example, the status may be full health, minor failure, major failure, and critical failure. These status levels cascade upward through the system hierarchy according to various inheritance rules and determine the health of the system.

In addition, these system tools generally rely upon only negative health characteristics. For many applications, especially in the network environment, it is useful to know which components have positive health metrics. This may facilitate switchovers in redundant architectures to ensure the most efficient operation of the network and the best quality of service.

Therefore, it would be useful if there were applications that also tracked and monitored positive health characteristics as well as negative characteristics. Additionally, it would be useful if these applications used more finely granulated designations than a small number of status levels.

SUMMARY

One embodiment is a network device. The network device includes a least one communication port that allows communication with at least one other network device and storage to store a rules database. At least one health monitor module receives an event notification, and then accesses the rules database to locate a matching rule for the event notification and perform any tasks determined by the rules database.

Another embodiment is a method of monitoring a system. The method includes receiving an event notification and applying input rules to alter a health metric. Action rules are invoked depending upon the health metric. In one embodiment, there are several subsystems each with their own health metric. In another embodiment, there is a designated central health monitor that receives health metrics from each of the subsystems and produces a system health metric.

BRIEF DESCRIPTION OF THE DRAWINGS

The invention may be best understood by reading the disclosure with reference to the drawings, wherein.

DETAILED DESCRIPTION OF THE EMBODIMENTS

Applications management programs or suites offer network and system administrators the ability to monitor the health of various components. The programs provide alert conditions and notifications if intervention is necessary based upon the health of the system. Some examples include BMC Patrol™, from BMC Software, and HP Openview™ from Hewlett-Packard. A brief discussion of BMC Patrol™ may provide a summary of the prior art and to help in understanding of the invention.

BMC Patrol™ (Patrol) has a graphical user interface for the system operator that allows the operator to view the health of the servers and the applications running on those servers. An icon represents every facet of the system, and the icons change color and attributes depending upon the health of that facet. There are three thresholds that may be exceeded: Warning; Error; and Out of Bounds. If these thresholds are exceeded, various actions may be invoked, including recovery actions.

As an example, assume that Patrol monitors a server and its uninterruptible power supply (UPS). It monitors the speeds of all of the fans, the temperature of the UPS and the temperature of the main server. If any of these items reach the error threshold, then the system shuts down to prevent overheating. The option exists to normalize the attributes of the system into a scale of states, such as Normal, Error, Warning, Critical, etc. This can also be used in an additive manner to create "Meta" objects.

In the above example, each fan and the temperatures sensors would be attributes. Thresholds would be set for each of these for each state or status level. There may be a meta object "environment" that contained these. If any of the attributes enter the error state, that state is propagated to the environment object. If one fan were to fail, for example, that attribute would enter an error state, which would in turn cause the environment object to enter an error state. More than likely, this will cause the system to shut down.

The use of metrics will generally provide finer granularity than the use of statuses. A status indicates in which of a finite number of states an attribute resides. A metric is a measurement along a continuum between health and failure. In addition, if the metrics were to be added, there is more control over whether a system fails due to failure of one attribute. In the current applications, as mentioned above, failure of one attribute will cause the whole system to be failed, even if that is unnecessary in actual operating systems. In a system using metrics, for example, the metrics for all of the fans could be added together. Even if one fan were to fail, if the other fans were all operating with positive metrics, the system may not be failed.

Figure 1:
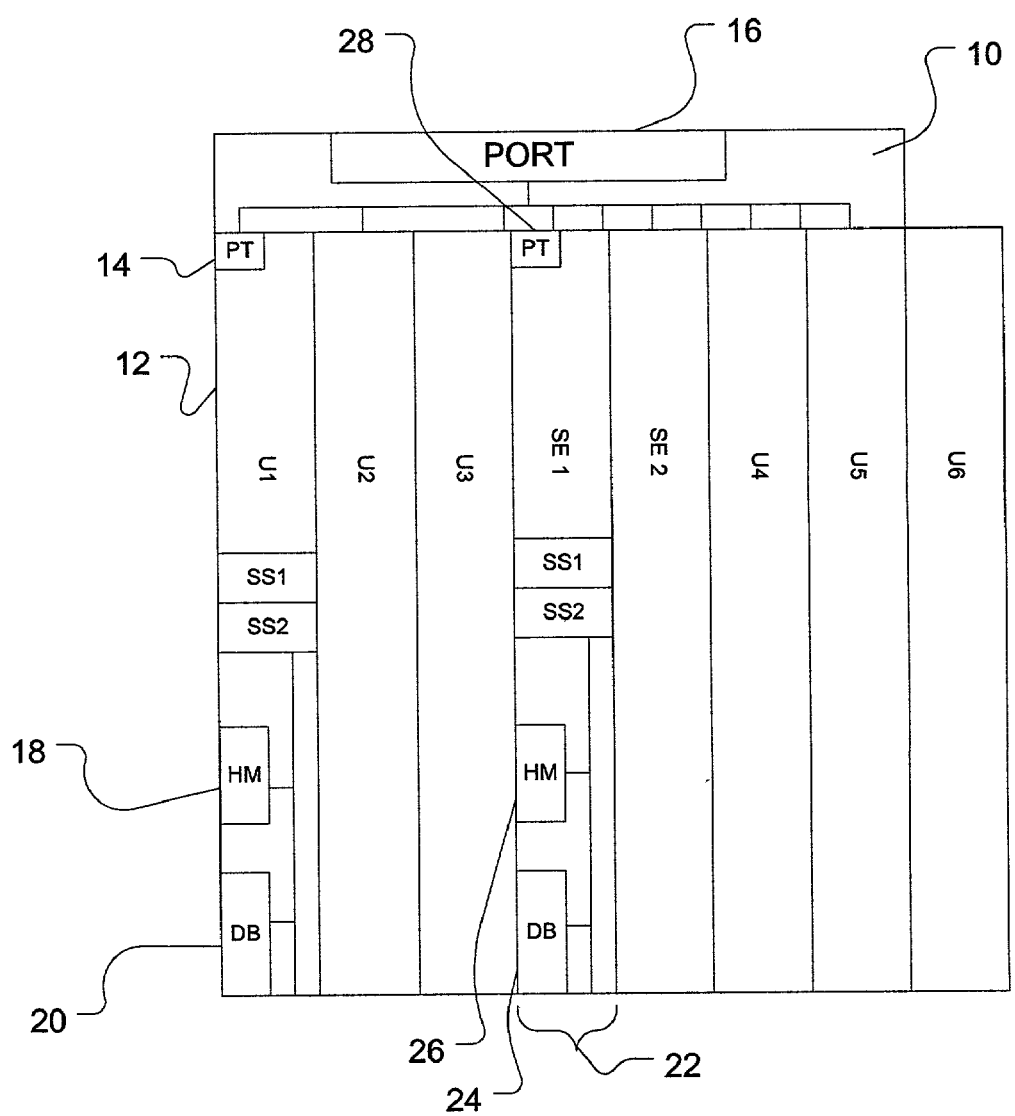
FIG. 1 shows one embodiment of a network device, in accordance with the invention.

An example of a network device with a health monitoring capability is shown in FIG. 1. The network device 10 may have several units, such as those shown by U1 through U6, or may be a single system. Each of the units, or the single system, will have a health monitor module 18, a rules database 20 and a port 14. In addition some of the units may have subsystems, such as those shown on U1, SS1 and SS2. The port 14 may be a port that communicates directly with other network devices, may communicate with other subsystems in the device, or may communicate through a centralized port.

The health monitor module manages the health metric for the system or unit. For ease of discussion, the use of the term 'system' may be applied to either a system or a unit. Each system has a health monitor that receives notification of events that transpire on the system. The health monitor then accesses a rules database that contains input rules. The input rules designate whether the event is a positive event or a negative event in terms of the health metric. For positive events some value may be added to the health metric, for negative events a value may be subtracted from the health metric. Different events may have different values.

The health monitor also determines if the health metric reaches or passes a threshold. Generally, in the example where positive events cause an increase in the value of the health metric and negative events cause a decrease, 'passing' a threshold, as used here, will mean that the health metric has reached or fallen below the threshold. In some situations, it may implemented in the opposite manner and passing a threshold may mean that the health metric has reached or risen above a predetermined threshold.

If the health metric for U1 falls outside the predetermined threshold, the health monitor module 18 may access the rules database 20 to locate an action rule that dictates what the system is to do about the failing or failed component. This may include doing nothing, notifying a system operator, or switching to a back up component. The back up component will more than likely be contained within the same system. For example, SE2 may act as the back up unit for SE1. As will be discussed in more detail further, the backup component may actually be a redundant unit or supervisory engine.

The network device may have one or more specialized units referred to as supervisory engines. In an embodiment with a supervisory engine, the network device 10 may have a central health monitor 26 on supervisory engine SE1 22. The health monitor 18 of U1 may report the health of U1 and then the health monitor 26 would collect reports from all of the other units in the network device 10. The health monitor 26 may have a separate rules database 24 to control the operations necessary for the entire device, not just the card or unit 22 upon which the health monitor 26 resides. For that reason the unit 22 is not referred to as a unit, but as a supervisory engine that supervises operation of the line cards, sometimes referred to as feature cards, the subsystems U1–U6.

In an embodiment of the invention, the supervisory engines may be route switch controllers. A route switch controller, as the term is used here, contains the egress port, and manages and configures the system 10. The route switch controller will include router functionality and point-to-point fast Ethernet switching to each subsystem or feature card. However, the routing or switching functionality is merely one example of a supervisory engine, and the supervisory engines do not need to perform these tasks. As will be discussed in more detail further, the system 10 may also include a backup or standby supervisory engine, shown as SE2 in FIG. 1. The switch over to the backup supervisory engine will depend upon the health metric.

Figure 2:
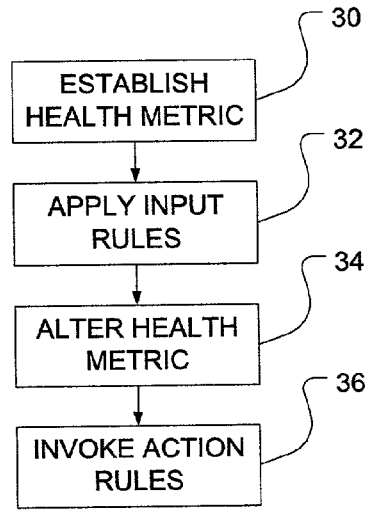
FIG. 2 shows a flowchart of one embodiment of a method of monitoring a system, in accordance with the invention.

A flowchart of an embodiment of a method to monitor a system is shown in FIG. 2. Again, as mentioned previously, the term system as used here includes subsystems. At 30, a health metric is established. Typically, this will involve initializing a variable with a value between 1 and 0, inclusive. In one embodiment a value of 1 will be considered full health and 0 will be considered unhealthy. In this embodiment, successful events will result in a value being added to the health metric, increasing its value, and negative events will result in a value being subtracted from the health metric, decreasing its value. Obviously, the inverse situation can also be used, where healthy is a value of 0 and unhealthy is a value of 1.

As events occur, the input rules 32 are applied. The input rules reside in the rules database 20, as an example from FIG. 1. As examples, and with no intention of limiting the scope of the invention, events may include such things as a successful call, an unsuccessful call or a memory allocation error. After a successful call is completed, the notification of the successful call results in an event notification, which in turn triggers application of the input rules. The input rule may dictate that a value is added to the health metric for the DS0 (64 kbps digital line) used and the DSP (digital signal processor) used for that call. An event notification of an unsuccessful call would then result in a value being subtracted from the health metric for those two entities. A memory allocation error would result in a value being subtracted from a memory health metric.

Another aspect of the health metric is that the values added or subtracted for different events may be weighted. For example, the completion of a successful call may add a much smaller value to the health metric for a DSP than that subtracted from the memory health metric for a memory allocation error. Similarly, the supervisory engine may gather health metrics from different types of components and produce a system health metric. The health metrics from different types of components may have different weights, as the health of one component may be more important to the system health than others. These weightings will more than likely be dictated by the input rules.

Application of the input rules results in an altered health metric at 34. The health monitor module then may compare the health metric to a threshold value or makes some other determination as to whether the system is healthy or unhealthy. This determination may result in invocation of action rules at 36. For example, if the health metric passes a threshold value, the system may send a message to the system administrator indicating that the component with the 'unhealthy' health metric is failing. For purposes of discussion here, the health metric falling below a threshold in the embodiment where 0 is unhealthy and 1 is healthy, will be referred to as passing or exceeding the threshold. This will prevent confusion in case the health metrics are established as the opposite case, in which 0 is healthy and 1 is unhealthy. While the above embodiments using the normalized value between 0 and 1 simplify computations, any type of metric may be used.

Figure 3:
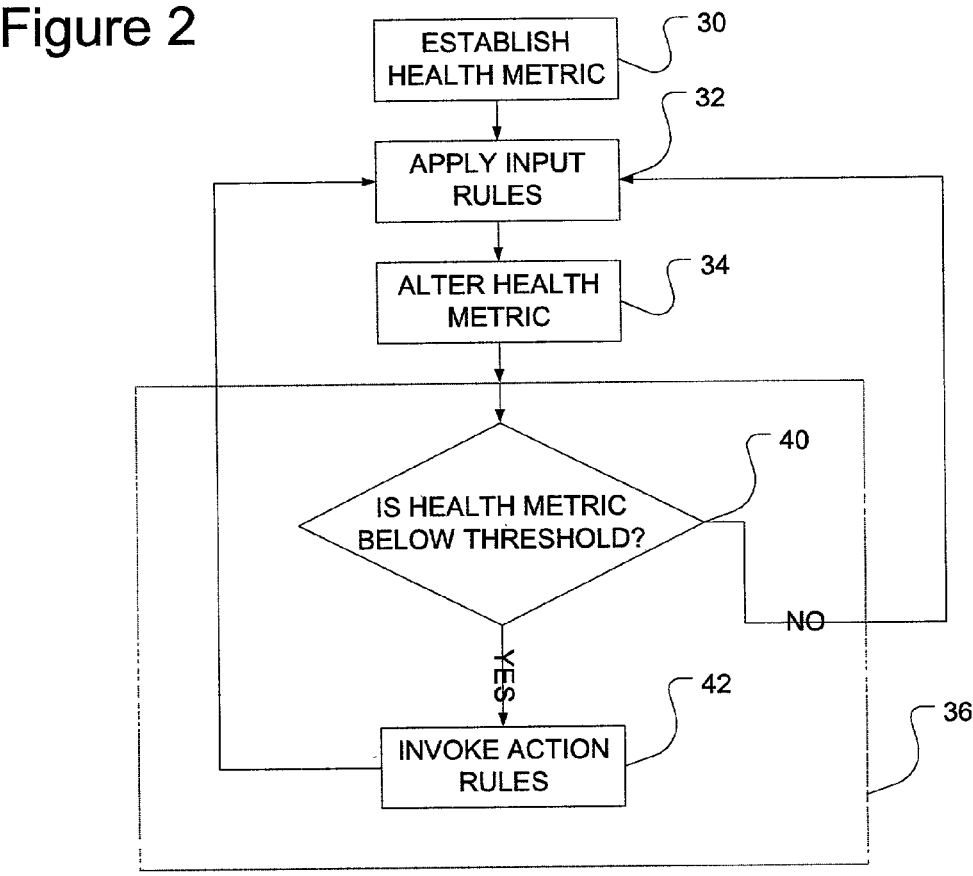
FIG. 3 shows a flowchart of an alternative embodiment of a method of monitoring a system, in accordance with the invention.

A more detailed view of invoking the action rules at 36 is shown in FIG. 3. It must be understood that, as defined here, invocation of the action rules includes invocation of no rules in the case of a healthy system. Within the process 36 from FIG. 2, a more detailed embodiment can be seen in FIG. 3. The health metric is compared against the health metric at 40. If the health metric is 'below' or passes the threshold, the process moves to 42 where the appropriate action rule is invoked. If the health metric indicates that the system is healthy, at 40, the process returns to monitoring events and applying the action rules at 32.

Figure 4:
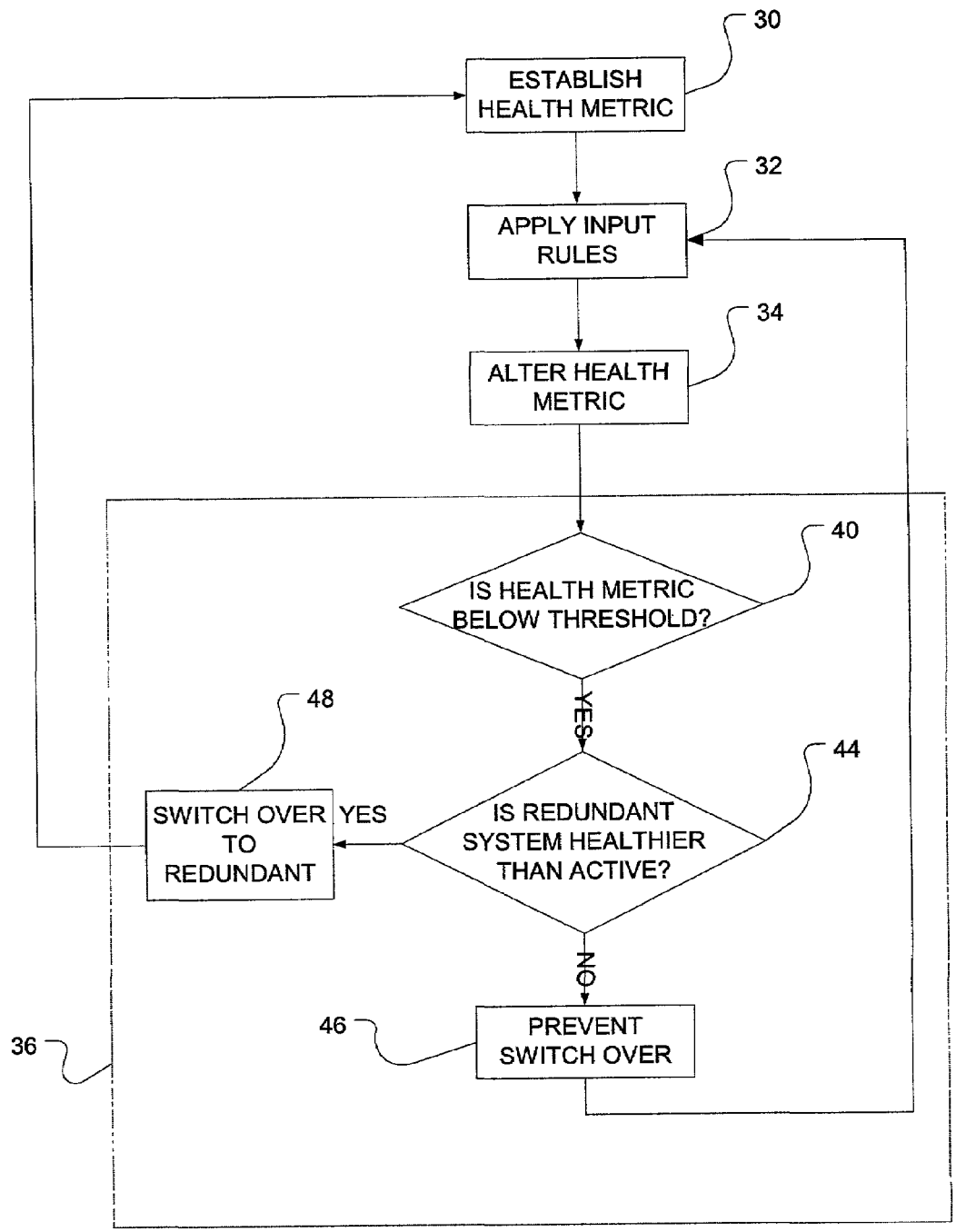
FIG. 4 shows a flowchart of an embodiment of invoking the action rules.

In another particular embodiment of invoking of the action rules 36 of FIG. 2, the action rules may cause a switch over to a backup or standby component. This is shown in more detail in FIG. 4. In this case, the specific backup or standby component is the supervisory engine 2 SE2 from FIG. 1. However, it may apply to any backup or standby component. The supervisory engine switchover has many different possibilities of implementation, two alternatives are discussed below.

In a first embodiment, the switch over is done in a 'hot' standby architecture. The active supervisory engine has full control of the resources of the network device, and handles tasks. The standby supervisory engine is just kept up to date with the system state. If the active supervisory engine health metric passes the threshold and the redundant system is healthier than the active system at 44, a switch over is performed at 48 and the standby supervisory engine becomes the active and takes control of the device.

In a second embodiment, a load sharing redundant architecture may be used. Both supervisory engines handle calls and tasks in an equal footing. If one of the supervisory engines fail at 44, the other would pick up the resources and tasks that were handled by the failing supervisory engine at 48.

Currently available systems may check whether the standby system has failed when deciding to switch over. The standby may be marked as failed and therefore not take over from the active supervisory engine even though it may be in a better state to do so. With a small number of status levels, this situation is difficult to avoid. However, application of the invention allows a much more powerful comparison to be made due to the vastly larger number of status levels. The health metric of the active supervisory engine and that of the standby would be compared. If the active supervisory engine's health metric is lower than the standby's, the switch over would occur. If the active's is higher than the standby's, the switchover would be prevented at 46.

In either one of these embodiments, the actual switch over depends upon the health monitor module monitoring of the health metric. The health monitor module may be a stand-alone processor or other circuit in the system, or may be a 'portion' of the DSP or other processor that controls the system, where the system may be the network device, a unit or a supervisory engine. Additionally, the health monitor module may be in the form of an article containing machine-readable code, wherein execution of the code by the machine such as a processor, causes the machine to perform the processes of the invention.

In this manner, the system can monitor, adjust and act upon the health of the system. This allows a system to continue to handle its tasks and remain on line, even when it is having operational problems.

Thus, although there has been described to this point a particular embodiment for a method and apparatus for monitoring the health of a system, it is not intended that such specific references be considered as limitations upon the scope of this invention except in-so-far as set forth in the following claims.

What is claimed is:

1. A network device, comprising:
   a least one communication port to allow communication with at least one other network device;
   a storage to store a rules database; and
   at least one health monitor module to:
      maintain a system health metric and to receive an event notification of a task performance;
      alter the health metric based upon the outcome of the task performance, wherein there are multiple tasks that affect the health metric; and
      access the rules database for a matching rule for the event notification and perform any tasks determined by the rules database, including causing a switch over to a standby unit if the health metric for a first unit falls below a predetermined threshold, wherein the switch over is prevented if a health metric for the standby unit is lower than the health metric for the first unit.

2. The network device of claim 1, wherein the unit further comprises a supervisory engine.

3. The network device of claim 1, wherein the rules database includes a set of rules for each unit.

4. The network device of claim 1, wherein the network device further comprises several subsystems and each unit includes a health monitor.

5. The network device of claim 4, wherein the health monitor on one unit is designated as a central health monitor and receives at least one health metric from each of the other units.

6. A method for monitoring a system, the method comprising:
   establishing a health metric;
   applying input rules to the health metric, wherein the rules alter the health metric based upon a performance of a task, wherein there are multiple tasks; and
   invoking action rules, wherein the action rules are invoked depending upon the health metric and wherein the action rule causes a switch over to a standby unit if the health metric for a first unit falls below a predetermined threshold wherein the switch over is prevented if a health metric for the standby unit is lower than the health metric for the first unit.

7. The method of claim 6, wherein establishing a health metric further comprises establishing a health metric for each of several subsystem units.

8. The method of claim 7, wherein a central health monitor receives the health metric for each subsystem and produces a system health metric.

9. The method of claim 6, wherein applying input rules further comprises:
   adding values to the health metric for successful task performance; and
   subtracting values from the health metric for unsuccessful task performance.

10. The method of claim 9, wherein the values are weighted depending upon the task.

11. The method of claim 6, wherein the health metric further comprises a normalized value between 0 and 1.

12. The method of claim 6, wherein the action rules are invoked when the health metric for a first unit passes a predetermined threshold.

13. A network device, comprising:
   a means for allowing communication with at least one other network device;
   a means for storing a rules database; and
   at least one means for:
      maintaining a system health metric for receiving an event notification about a task performance;
      altering the health metric based upon the outcome of the task performance, wherein there are multiple tasks that affect the health metric;
      accessing the rules database for a matching rule for the event notification; and
      performing any tasks determined by the rules database including altering the health metric in response to the event, wherein the health metric is altered by any one of multiple events and including causing a switch over to a standby unit if the health metric for a first unit falls below a predetermined threshold such that the switch over is prevented when a health metric for the standby unit is lower than the health metric for the first unit.

14. The network device of claim 13, wherein the network device further comprises at least one supervisory engine.

15. The network device of claim 13, wherein the rules database includes a set of rules for each unit.

16. The network device of claim 13, wherein a health monitor on one unit is designated as a central health monitor and receives at least one health metric from any other units.

17. An article containing machine-readable code that, when executed, causes the machine to:
    establish a health metric;
    apply input rules to the health metric, wherein the rules alter the health metric based upon task performance of each of several tasks; and
    invoke action rules, wherein the action rules are invoked depending upon the health metric, wherein the action rule causes a switch over to a standby unit if the health metric falls below a predetermined threshold wherein the switch over is prevented if a health metric for the standby unit is lower than that of the first unit.

18. The article of claim 17, wherein the code, when executed, causes the machine to establish a health metric for each of several units.

19. The article of claim 17, wherein the code, when executed, causes the machine to designate a central health monitor and causes the central health monitor to receive the health metric for each unit and produces a system health metric.

20. The article of claim 17, wherein the code that causes the machine to apply input rules further causes the machine to:
    add values to the health metric for successful task performance; and
    subtract values from the health metric for unsuccessful task performance.

21. The article of claim 17, wherein the code that causes the machine to add values further causes the machine to weight the values depending upon the task.

* * * * *